(12) United States Patent
Choe et al.

(10) Patent No.: US 11,042,157 B2
(45) Date of Patent: Jun. 22, 2021

(54) LANE/OBJECT DETECTION AND TRACKING PERCEPTION SYSTEM FOR AUTONOMOUS VEHICLES

(71) Applicant: Baidu USA LLC, Sunnyvale, CA (US)

(72) Inventors: Tae Eun Choe, Sunnyvale, CA (US); Jun Zhu, Sunnyvale, CA (US); I-Kuei Chen, Sunnyvale, CA (US); Guang Chen, Sunnyvale, CA (US); Weide Zhang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 363 days.

(21) Appl. No.: 16/042,955

(22) Filed: Jul. 23, 2018

(65) Prior Publication Data

US 2020/0026282 A1 Jan. 23, 2020

(51) Int. Cl.
| | |
|---|---|
| *G05D 1/00* | (2006.01) |
| *G06T 7/50* | (2017.01) |
| *G05D 1/02* | (2020.01) |
| *G06K 9/00* | (2006.01) |
| *B60W 10/20* | (2006.01) |
| *B60W 10/04* | (2006.01) |
| *B60W 10/18* | (2012.01) |

(52) U.S. Cl.
CPC ......... *G05D 1/0088* (2013.01); *G05D 1/0214* (2013.01); *G05D 1/0221* (2013.01); *G05D 1/0246* (2013.01); *G05D 1/0257* (2013.01); *G05D 1/0278* (2013.01); *G06K 9/00798* (2013.01); *G06T 7/50* (2017.01); *B60W 10/04* (2013.01); *B60W 10/18* (2013.01); *B60W 10/20* (2013.01); *G05D 2201/0212* (2013.01); *G06T 2207/10028* (2013.01); *G06T 2207/20081* (2013.01); *G06T 2207/30256* (2013.01)

(58) Field of Classification Search
CPC .. G05D 1/0088; G05D 1/0214; G05D 1/0221; G05D 1/0246; G05D 1/0257; G05D 1/0278; G06T 7/50; G06K 9/00798
See application file for complete search history.

(56) References Cited

U.S. PATENT DOCUMENTS

| | | | | |
|---|---|---|---|---|
| 7,124,027 | B1 * | 10/2006 | Ernst, Jr. ............... | G01S 13/931 701/301 |
| 2007/0109111 | A1 * | 5/2007 | Breed .................... | G08G 1/166 340/435 |
| 2017/0008521 | A1 * | 1/2017 | Braunstein ........ | B60W 60/0015 |
| 2017/0247029 | A1 * | 8/2017 | Watanabe ............. | G08G 1/167 |

* cited by examiner

*Primary Examiner* — Ramsey Refai
(74) *Attorney, Agent, or Firm* — Womble Bond Dickinson (US) LLP

(57) ABSTRACT

According to some embodiments, a system pre-processes, via a first thread, a captured image perceiving an environment surrounding the ADV obtained from an image capturing device of the ADV. The system processes, via a second thread, the pre-processed image with a corresponding depth image captured by a ranging device of the ADV using a machine learning model to detect vehicle lanes. The system post-processes, via a third thread, the detected vehicle lanes to track the vehicle lanes relative to the ADV. The system generates a trajectory based on a lane line of the tracked vehicle lanes to control the ADV autonomously according to the trajectory.

21 Claims, 12 Drawing Sheets

LANE/OBJECT DETECTION AND TRACKING PERCEPTION SYSTEM FOR AUTONOMOUS VEHICLES

TECHNICAL FIELD

Embodiments of the present disclosure relate generally to operating autonomous vehicles. More particularly, embodiments of the disclosure relate to a lane/object detection and tracking perception system for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Perception is a critical input for autonomous driving vehicles. Perception may use EO/IR (Electro-optical/Infrared) camera sensors and RADAR/LIDAR/Ultrasonic sensors. Camera sensors are reliable in different weather conditions, however, LIDAR sensors may not be reliable in rain or snow conditions. There is a need for a reliable vision-based perception system for ADVs when LIDAR sensors may not be available.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
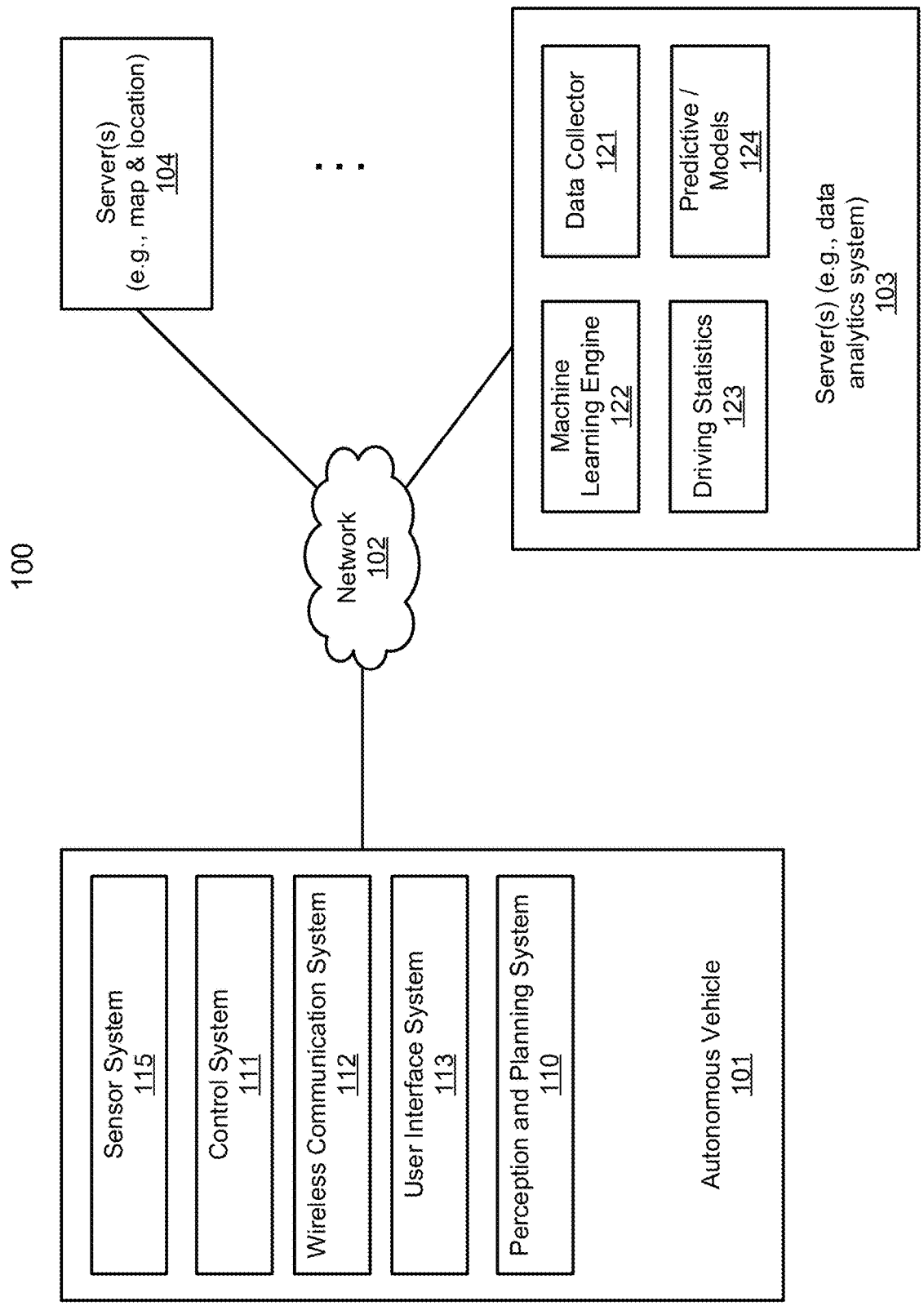
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Embodiments of the disclosures disclose a vision-based perception system for an ADV. The perception system includes a multi-stage (e.g., pre-processing, processing, and post-processing stages) workflow for Level-2 autonomous driving with low cost sensors. An ADV can stay in the lane and/or keep a distance with a closest in-path vehicle (CIPV) using single or multiple front-facing cameras and a frontal radar sensor. In addition, the ADV can support high-speed autonomous driving on a highway route based on the multi-stage workflow perception when map information may or may not be available. Finally, the performance and accuracy of a machine learning model (e.g., deep neural network) of the perception system will improve over time as more data are collected for training.

According to one aspect, a system pre-processes a captured image perceiving an environment surrounding the ADV obtained from an image capturing device of the ADV. The system processes the pre-processed image with a corresponding depth image captured by a ranging device of the ADV using a machine learning model to detect vehicle lanes. The system post-processes the detected vehicle lanes to track the vehicle lanes relative to the ADV. The system generates a trajectory based on a lane line of the tracked vehicle lanes to control the ADV autonomously according to the trajectory. The operations of pre-processing a captured image, processing the pre-processed image, and post-processing the detected vehicle lanes are performed using different threads in a pipelined manner.

According to a second aspect, the system processes the pre-processed image with a corresponding ranging depth image using the machine learning model to detect a set of objects perceived by the ADV. The system post-processes the set of detected objects to track the set of objects according to a distance between the objects and the ADV. The system generates the trajectory based on a time to collision (TTC) measurement to a tracked object and the lane line to control the ADV autonomously according to the trajectory.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle communication standard designed to allow microcontrollers and devices to communicate with each other in applications without a host computer. It is a message-based protocol, designed originally for multiplex electrical wiring within automobiles, but is also used in many other contexts.

Figure 2:
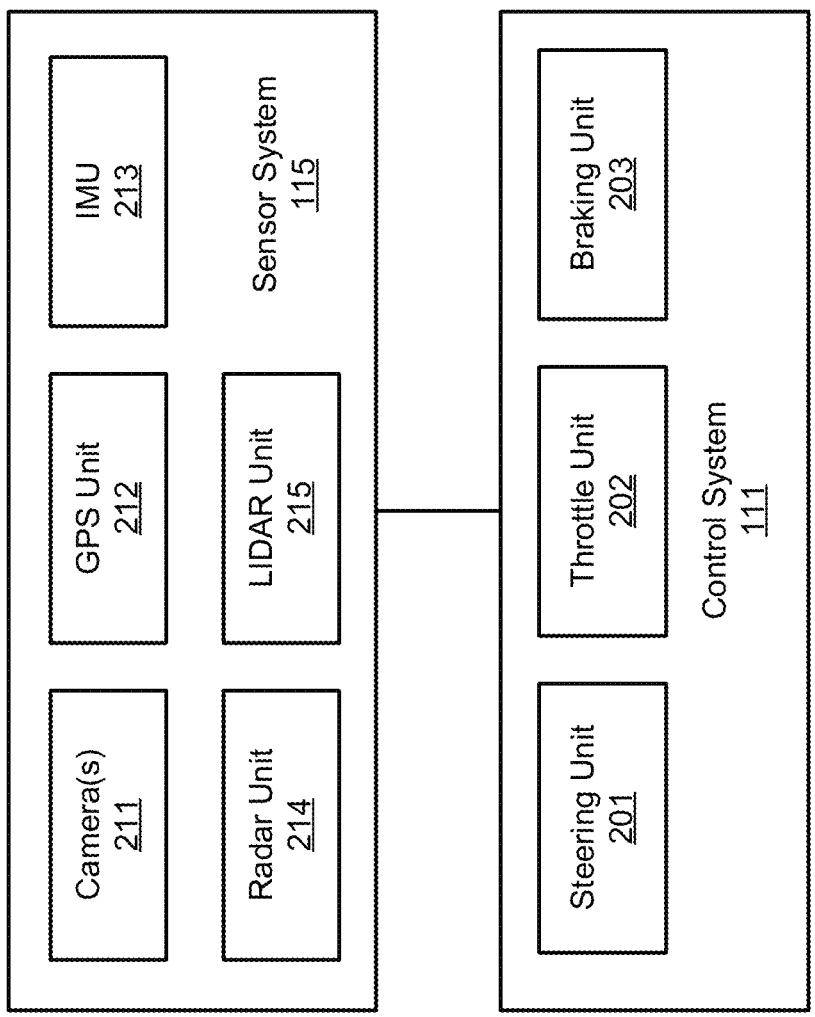
FIG. 2 is a block diagram illustrating an example of a sensor and control system using by an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be stationary cameras and/or PTZ (pan-tilt-zoom) cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor (e.g., electric power steering (EPS)) may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or models 124 for a variety of purposes. In one embodiment, for example, algorithms/model 124 may include one or more machine learning models to detect lane lines and/or objects. The machine learning models can be trained and uploaded onto ADVs to be used for autonomous driving by the ADVs, in real-time.

Figure 3A:
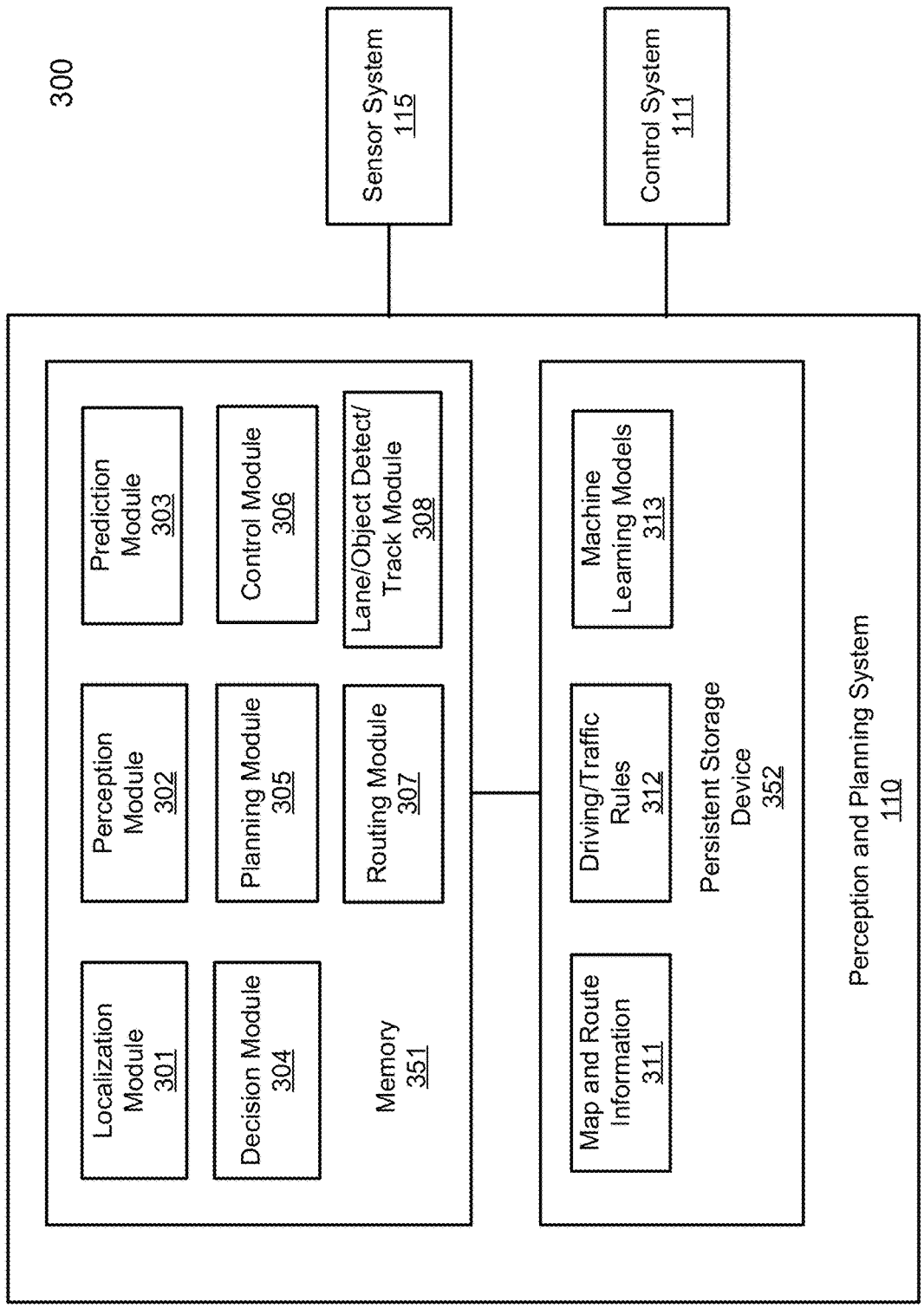
FIGS. 3A-3B are block diagrams illustrating examples of a perception and planning system used by an autonomous vehicle according to some embodiments.
Figure 3B:
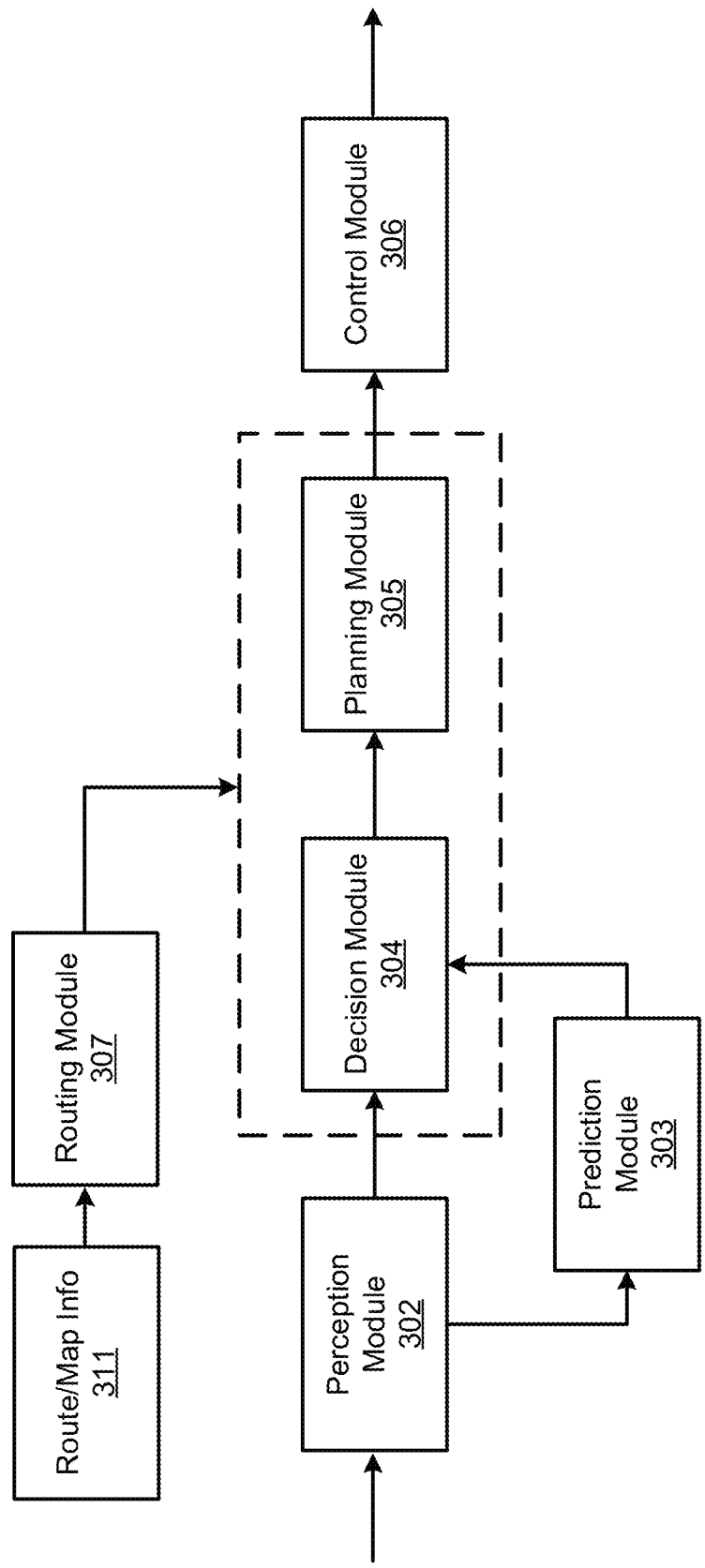

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing/sampling module 307, and lane/object detect/track module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, lane/object detect/track module 308 and perception module 302 may be integrated as a single module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts how the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle). That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle. Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Figure 4:
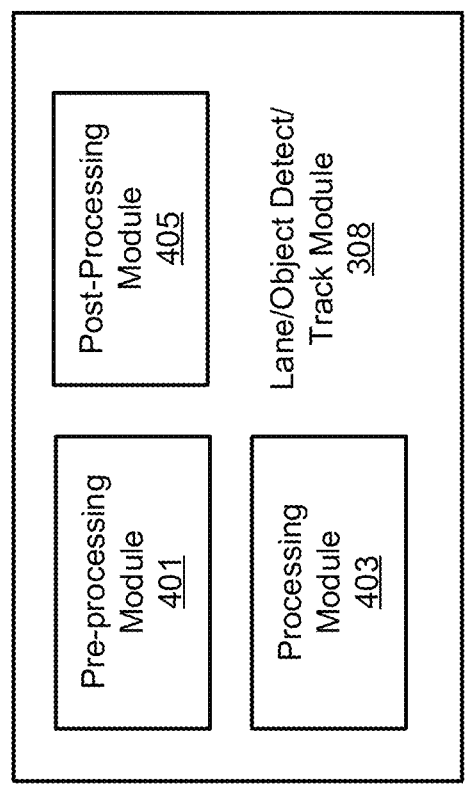
FIG. 4 is a block diagram illustrating an example of a lane/object tracking module according to one embodiment.

FIG. 4 is a block diagram illustrating an example of a lane/object tracking module according to one embodiment. Referring to FIG. 4, lane/object detect/track module 308 can detect and track lane lines and/or objects perceived by an ADV. Lane/object detect/track module 308 can then generating a driving trajectory for the ADV based on the tracked lane lines and/or objects to follow the tracked lane lines and/or objects. In one embodiment, lane/object detect/track module 308 includes pre-processing module 401, processing module 403, and post-processing module 405. Pre-processing module 401 can pre-process images captured by an image capturing device (e.g., one or more cameras). Processing module 403 can process an image to detect any lane lines and/or dynamic/static objects. Post-processing module 405 can post-process the detected lane lines and/or objects. Post-processing module 405 can also infuse a radar depth image with the captured image to obtain more information about the detected objects (e.g., speed, time to collision, distance of the objects). Post-processing module 405 can also post-process the detected lane lines to convert the lane lines from an image plane to a real world coordinate (e.g., such as a top-down view).

As described above, the operations performed by pre-processing module 401, processing module 403, and post-processing module are performed by different threads substantially concurrently or in a pipelined manner. The threads may be executed by different processors and/or different processor cores of a processor. For example, according to one embodiment, pre-processing module 401 may process via a first thread first perception data for a first planning cycle or driving cycle. Processing module 403 may process via a second thread second perception data for a second planning cycle, which represents an output produced by the pre-processing module for a planning cycle prior to the second planning cycle. Post-processing module 405 may process via a third thread third perception data for a third planning cycle, which represents an output produced by processing module 403 for a planning cycle prior to the third planning cycle.

Figure 5:
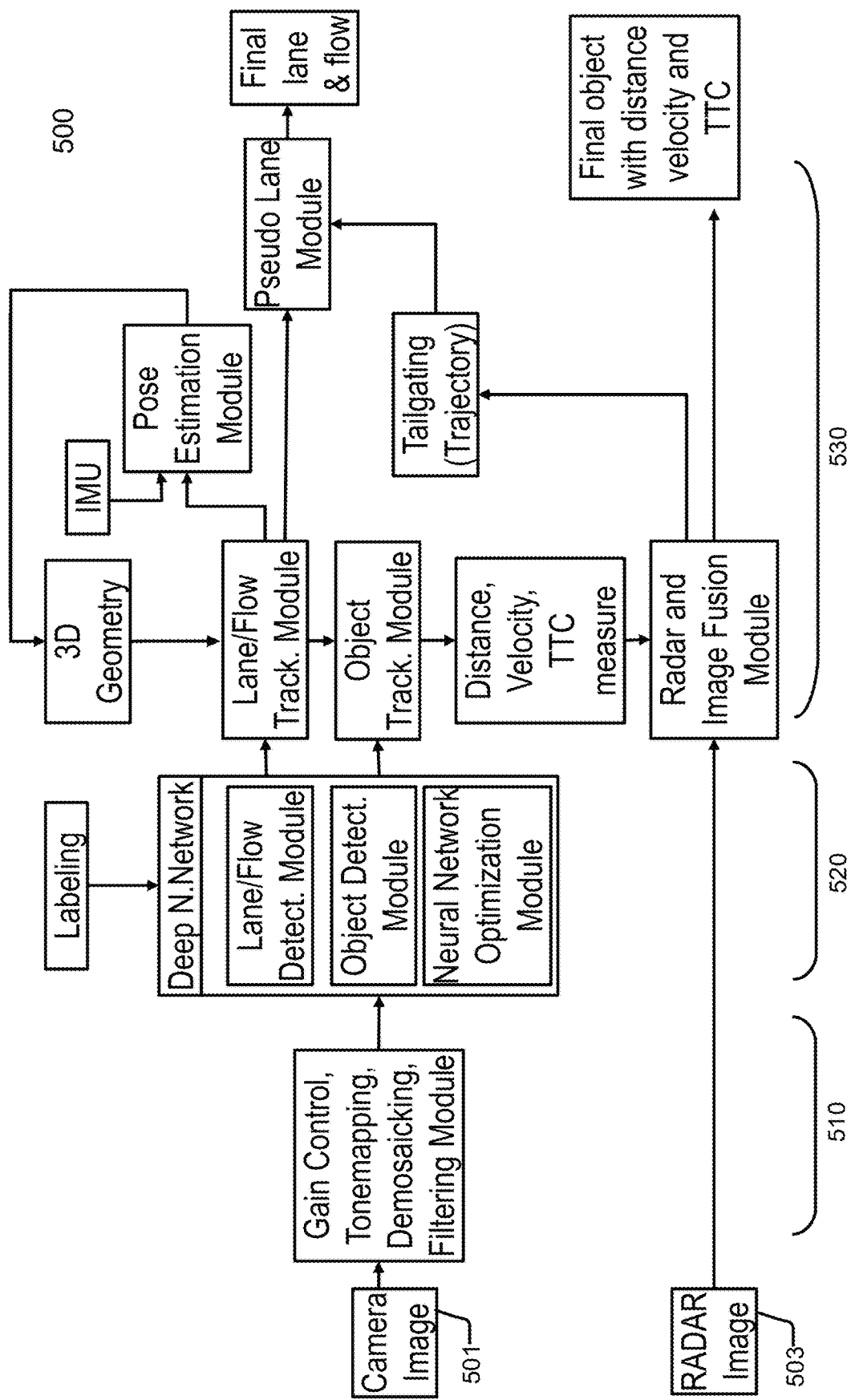
FIG. 5 is a block diagram illustrating an example of a multi-stage perception workflow according to one embodiment.

FIG. 5 is a block diagram illustrating an example of a multi-stage perception workflow according to one embodiment. Multi-stage perception workflow 500 includes three stages: pre-processing stage 510, processing stage 520, and post-processing stage 530. In one embodiment, these three stages or workflow 500 can be performed by lane/object tracking module 308.

Pre-Processing Stage

Referring to FIG. 5, for the pre-processing stage 510, workflow 500 receives image 501 (such as an RGB (red-green-blue) image) captured by an image capturing device (e.g., camera) to be pre-processed. Pre-processing can include, but is not limited to, adjusting an exposure control, a gain control, a tone mapping, white balancing, and demosaic & bilateral filtering to be applied to the image. The pre-processing prepares the image to better identify objects (e.g., traffic lights, pedestrians) and lane lines based on the time of day and weather conditions. For example, at night time, the image should allow for a higher amount of light exposure in the image than at day time, such that objects and lane lines can be better identified. The pre-processing can be performed by one or more processing threads of a graphics processing unit of the perception system. In one embodiment, pre-process stage is processed by a GPU and/or a CPU thread which may be different from the processing and post-processing stages. Such processing threads may be configured in a pipelined manger.

Processing Stage

For the processing stage 520, a deep neural network or a machine learning model is trained (using labels) to detect lane lines and objects in a pre-processed image. The machine learning model can be a deep neural network model trained to detect lane lines and/or dynamic/static objects. In one embodiment, the deep neural network model can be a convolutional neural network (CNN) model having convolutional and/or deconvolutional layers. In another embodiment, inner layers of the CNN model can be partially connected and/or fully connected. The training for the neural network model can be performed by server 103 of FIG. 1 or onboard the ADV. In one embodiment, a single machine learning model is co-trained to detect both lane lines and dynamic/static objects. Note, a co-trained model allows two simultaneous outputs (e.g., objects and lane lines) using only one inference. For example, the objects to be detected can be a vehicle, a truck, a cyclist, a pedestrian, etc. and the lane lines can be detected by segmentation using the same model. Further, the model can classify the detected objects with orientation information and bound them using 2-D bounding boxes. In another embodiment, the machine learning model can have two separate models to detect lane lines and dynamic/static objects. Note, individual machine learning models or neural networks such as a lane detection network or an object detection network usually perform better than one co-trained multi-task network. However, with limited resource, multiple individual neural network models can be costly and can consume more processing time than a single co-trained neural network model. In addition, a neural network model can be optimized by a network optimization module to use int8 variables instead of a float variable to store the data points of the neural network model so to achieve a fast network inference rate. For example, a co-trained neural network model with int8 variables can achieve up to a 13 millisecond inference rate using NVIDIA TensorRT with a NVIDIA GTX 1080 Ti graphics card or graphics processing unit. In some embodiments, the processing stage is processed by a GPU and/or a CPU thread different from the pre-processing and post-processing stages.

Note, the machine learning model may include, but is not limited to, neural networks (fully connected, partially connected, or a combination thereof), support vector machines (SVM), linear regression, k-nearest neighbors, naive bayes, k-means, and random forest models. A neural network is a machine learning model which can learn to perform tasks by considering examples (e.g., training with input/output scenarios), without being programmed with any task-specific rules. A neural network is a computational approach based on a large collection of neural units or neurons in a series of hidden layers or inner layers. Each hidden layer is made up of a set of neurons, where each neuron is connected to one or more neurons in the previous layer, and where neurons in a single layer can function completely independently and do not share any connections with other neurons of the layer. A neural network is self-learning and trained, rather than explicitly programmed. A fully connected layer is an inner layer having neurons with full connections to all neurons in the previous layer. A partially connected layer is an inner layer having neurons with partial connections to all neurons in the previous layer. A convolutional/deconvolutional layer has each neuron connected only to a local region in the previous layer spatially, but to the full depth (i.e. all color channels for an image).

Object Detection Module

Object detection can categorize objects as dynamic objects or stationary objects. In an example traffic scene, stationary objects can include lane lines, traffic lights, and traffic signs which may be written in any number of different languages. Stationary objects can also include landmarks, e.g., objects or features of a landscape that can be detected from a distance. Such landmarks can enable an ADV to establish its relative location/distance. Example landmarks include streetlamps, barriers, bridge, and/or walkways.

Dynamic objects can include passenger vehicles, trucks, cyclists, pedestrians, an animal, or a person or portions of a person (e.g., body parts), or any other object that is not stationary. Dynamic objects can be bounded by two-dimensional (2D) bounding boxes. In one embodiment, objects can be categorized in different levels of importance based on which lane the object is in. For example, a dynamic object that is closest object in path of the vehicle (CIPV) can be categorized with importance level one, with one being the most important and ten being the least. Dynamic objects in neighbor lanes can be categorized with importance level two. Stationary objects such as monument landmarks can be categorized with a lower importance level, such as a nine or a ten, etc.

In one embodiment, given a 2D bounding box, with a 3D size and orientation of the detected object, object detection module can determine a 3D distance for the 2D bounding box and convert the 2D bounding box to a 3D bounding box. For example, object detection module can project a 3D representation (in the form of a 2D projection) of a detected object having a known size onto the camera view with different distances to search (e.g., binary search) for a match to the 2D bounding box using a width, a height, and/or a 2D area of the 2D bounding box. Based on a matching projection, the 3D distance of the object to the ADV can then be estimated. The 2D box can then be converted to a 3D bounding box with 3D distance information. Furthermore, 3D distances of detect objects can be verified and/or further calibrated with RADAR measurements for the detected object. Note, a 3D distance is a directional distance vector in the real-world coordinate. In one embodiment, the 3D distance can be detected by object detection module using only minimal calibration for the camera, e.g., with only intrinsic parameters of the camera and weakly accurate or no extrinsic parameters of the camera.

Lane/Flow Detection Module Lane lines can be captured by RGB images using an image capturing device (e.g., camera) of the ADV. In one embodiment, lane lines markings captured in images are detected by a co-trained deep neural network model. For example, the neural network model can output a heat map of lane lines based on the captured images. The heat map can be a probability map of where lane lines are detected and this heat map can be processed to obtain the final lane lines. In another embodiment, lane lines can be detected by the neural network model based on perceived traffic flow of vehicles on the road. Flow is the center of two lane lines or the center of an expected vehicles path.

For the above cases, a probability map of lane lines can be obtained based on a trajectory/flow of objects (e.g., vehicles) in a path ahead of the ADV. In another embodiment, the neural network model can include a segmentation algorithm to generate a binary image for the lane lines, e.g., by segmenting the heat map. The segmentation algorithm can include a threshold-based segmentation, a region-based segmentation, an edge detection segmentation, a segmentation based on clustering, a segmentation based on weakly-supervised learning in convolutional neural network algorithm, etc. For example, for a threshold-based segmentation algorithm, a threshold value can be determined by k-means clustering, maximum entropy, maximum variance methods, etc.

Post-Processing Stage

For the post-processing stage 530, detected objects and/or lane lines can be post-processed to generate pseudo lane lines, type information for the pseudo lane lines, e.g., whether the lines are L1(next left lane line), L0(left lane line), R0(right lane line), R1(next right lane line), etc., and objects information for the detected objects. The objects information can include 3D boundary boxes, relative velocity and direction for the objects (e.g., vehicles), whether it is a CIPV, and classifications e.g., truck, car, pedestrian, bike, etc. The post-processing stage includes different modules to track lane lines, objects, and generate pseudo lines. In one embodiment, post-process stage is processed by a GPU and/or a CPU thread different from the pre-processing and processing stages.

Object Tracking Module

Dynamic objects can be tracked from one image frame to another by object identifiers (IDs). In one embodiment, the tracking can be performed using a multiple hypothesis tracking algorithm. Multiple hypothesis tracking algorithm is an algorithm to solve data associations by combining cues to provide the most correct association between tracks and detected objects. Objects cues can include a 3D position, 2D image patches, 2D boxes, or deep learning region of interest (ROI) features for the objects. Multiple hypothesis tracking algorithm can be applied to the detected objects to track these object using object IDs.

Tracked objects that are important include a CIPV, e.g., a closest vehicle in a same lane as the ADV. In one embodiment, tracked objects with importance level above a threshold are projected from a camera view to a hawk-eye view (e.g., top-down view) surrounding the ADV. Here, the tracked objects may be represented by a 3D bounding box and lane lines may be represented by one or more polylines and/or polynomial lines in the hawk-eye view. Then, the tracked object are determined if they are in a same lane as the ADV. An object in the same lane as the ADV and which is closest to the ADV is determined to be the CIPV. In one embodiment, the CIPV is used to determine a longitudinal control (e.g., velocity) of the ADV for the ADV to follow the CIPV.

Lane/Flow Tracking Module

Lanes lines can be used to generate a lateral control (e.g., steer left or steer right) command for the ADV to keep the ADV in a lane. In one embodiment, lane or lane lines can be represented by multiple sets of polylines such as a next left lane line, a left line, a right line, and a next right line. As described above, lane lines can be detected by a co-trained deep neural network model. For example, the neural network model can output a heat map for lane lines. The heat map can be a probability map for the lane lines. Lane detection/tracking module can convert the heat map using an image segmentation algorithm (e.g., thresholding algorithm) to a binary image, such as by thresholding the heat map. The threshold value for the algorithm can be determined by k-means clustering, maximum entropy, maximum variance methods, etc.

Figure 6:
FIG. 6 illustrates an example camera view of an ADV for an example driving scenario having lane lines according to one embodiment.
Figure 7:
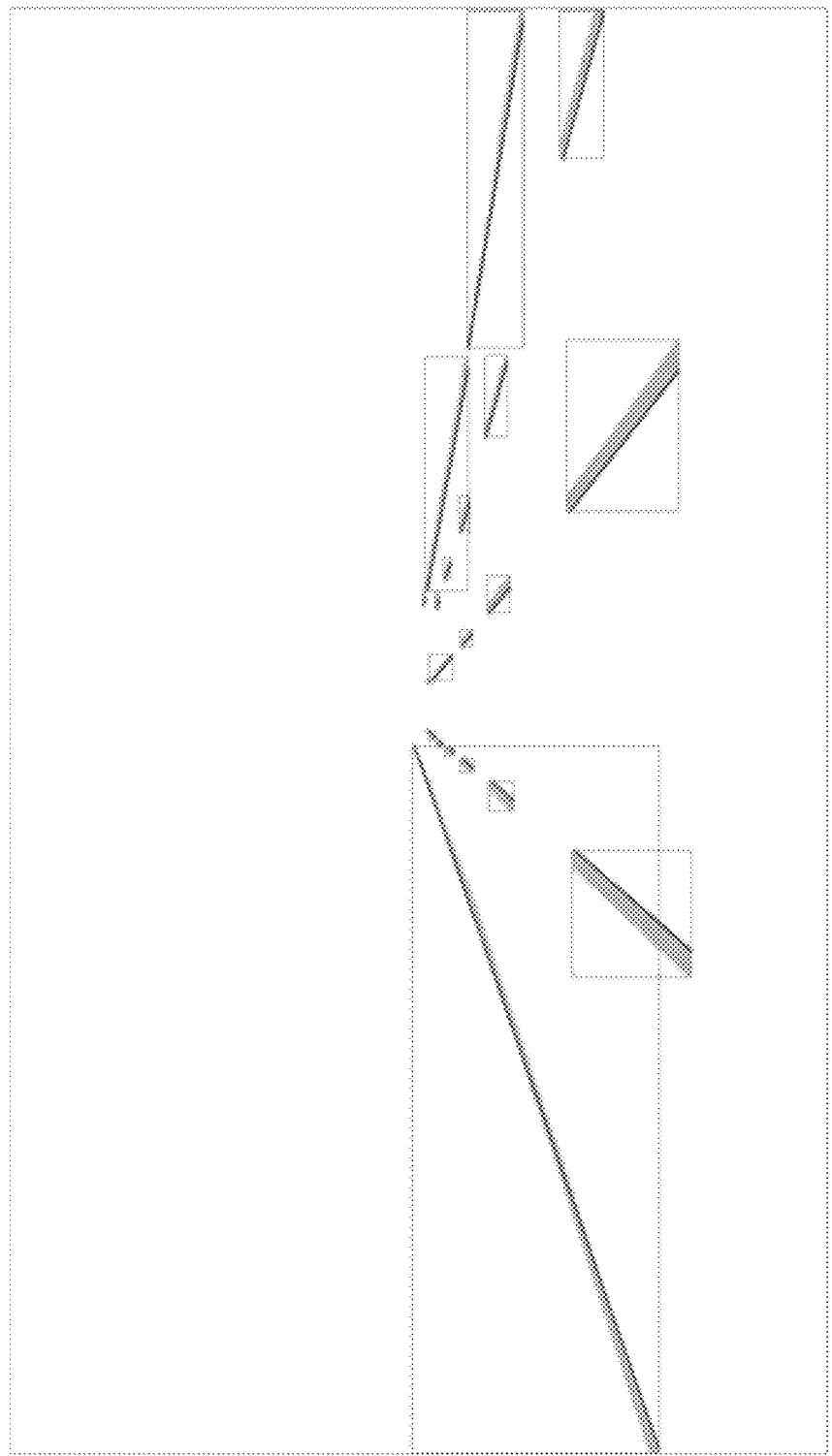
FIG. 7 illustrates a binary image for the lane lines with inner contours marked up for the example driving scenario of FIG. 6.

Once a binary image representing the lane lines is generated, lane detection/tracking module then determines a length for each component (e.g., markings/lane lines) in the binary image. For each component, lane detection/tracking module determines an inner contour or edge of the markings. In another embodiment, lane detection/tracking module may determine an outer contour of the lane lines, or a center line for the lane lines. Lane detection/tracking module then generates lane marker points based on the contour edges (e.g., inner and/or outer) on a ground space of ego-vehicle coordinate system. Thereafter, lane detection/tracking module associates these lane markers with several lane line objects having corresponding relative spatial label (e.g., left(L0), right(R0), next left(L1), next right(L2), etc.). The lane line objects are then used by the ADV to generate a lateral control (e.g., steer left or steer right) command for the ADV to keep the ADV within the contour edges of a lane. FIG. 6 illustrates an example camera view of an ADV for an example driving scenario having lane lines according to one embodiment. FIG. 7 illustrates an example binary image for the lane lines with inner contours marked up for the example driving scenario of FIG. 6. As shown in FIGS. 6-7, the example driving scenario is for a four lane roadway with the inner contour lines being marked up in the binary image in FIG. 7.

Pose Estimation Module

Figure 8:
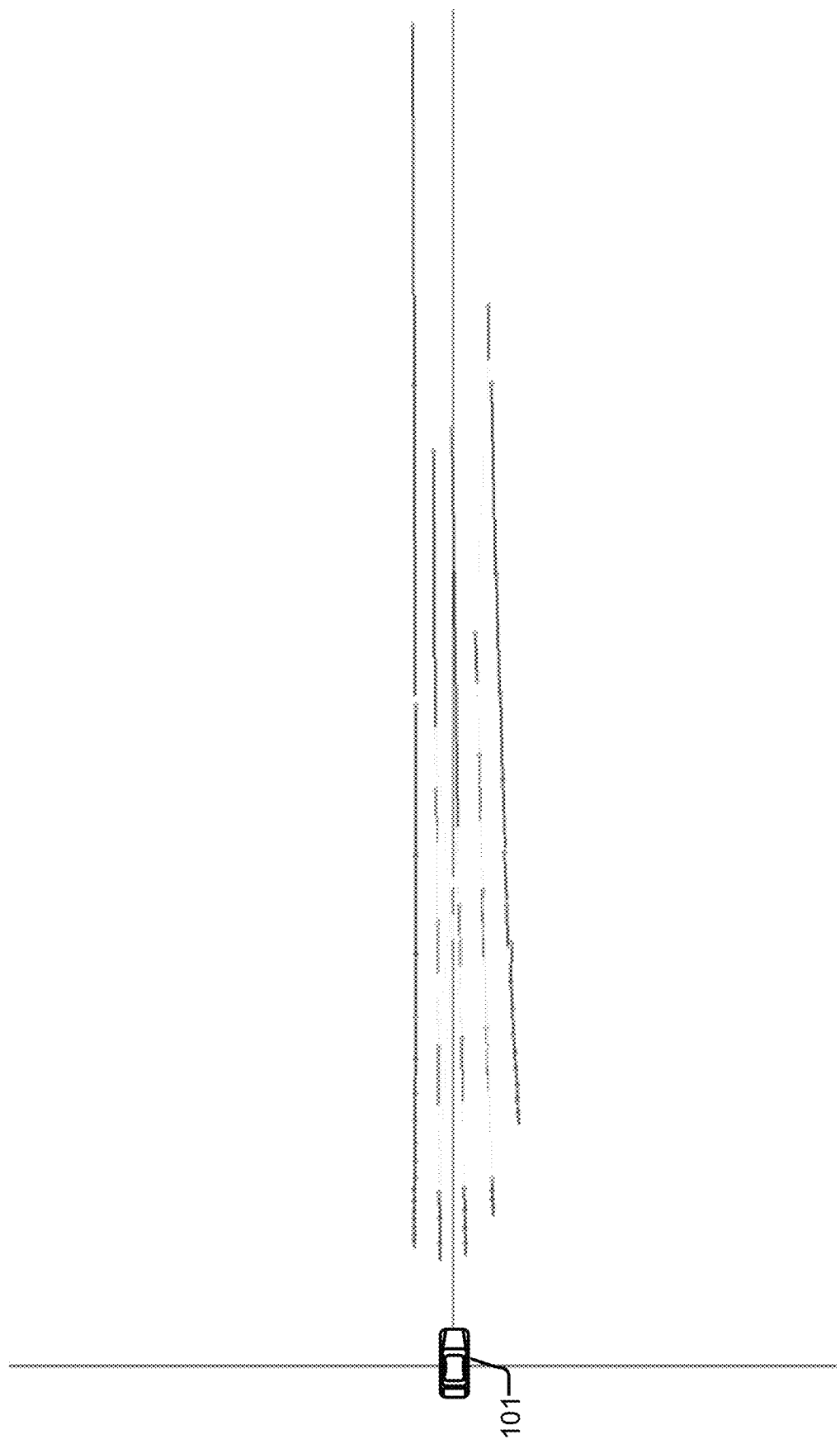
FIG. 8 illustrates an example top-down view of lane lines for the example driving scenario of FIG. 6.

In one embodiment, lane lines which are generated based on images captured by a camera device can be used to estimate a pose of the camera device. The combination of position and orientation information of the camera device is referred to as a pose of the camera. A camera pose can be described by means of a rotation and translation transformation and can be used to apply a transformation to bring an object from a reference pose (e.g., a 3D world) to a pose observed by the camera (e.g., camera view), or vice versa. Based on the estimated pose of the camera, the captured images and associated lane lines and/or objects can be transferred to a real-world coordinate (e.g., top down or hawk-eye view). The pose estimation can be performed online when the ADV is in operation. The estimation can be determined based on detected lane line markings and/or objects of an image. Furthermore, the estimation can be calibrated using position/velocity information from an IMU and/or GPS sensors. FIG. 8 illustrates an example top-down view of lane lines for the example driving scenario of FIG. 6. The top-down view of FIG. 8 can be a transformation from the camera view binary image of FIG. 7 once the camera pose is determined.

Radar and Camera Fusion Module

In some embodiments, outputs from multiple sensors of the ADV can be combined in a synergic fashion. For example, a sensor set can combine a RGB image 501 and a depth image 503 from a camera sensor and a RADAR sensor respectively. In this case, both sensors need to be calibrated. Calibration can synchronize the outputs of the sensors spatially and temporally. After the sensors are calibrated, the output can be combined in a coordinate system such as a 3-D world coordinate. Here, the camera sensor can determine geographical locations of detected lane lines and/or CIPV while the radar sensor can sense a distance from the CIPV to the ADV and a velocity for the CIPV. In other words, a camera sensor can determine a lateral distance of static and dynamic objects to the ADV while the RADAR can determine a longitudinal distance measurement of the objects. Based on the detected objects, the ADV can generate a trajectory to follow (e.g., tailgate) the CIPV and/or the lane lines.

Pseudo Lane Module

While most lane lines may be visible, some lane lines may be incorrect or missing in some of the captured images, e.g., when a truck is blocking a visible view of the lane lines or the lane lines are absent altogether. In this case, in one embodiment, a history of lane lines for the ADV and/or a tailgating trajectory can be used together with detected lane lines to provide an output for the lane lines, without any interruption. For example, an odometer value and historical lane lines of the ADV for past image frames are saved in a memory buffer for the pseudo lane module. In a subsequent frame, newly detected lane lines can be scrutinized based on the historical odometer value and lane lines according to a newly acquired odometer value for the subsequent frame, e.g., the odometer values indicates a location of the ADV with respect to the image frames at different time intervals to match the newly acquired lane lines with expected historical lane lines. In one embodiment, when a newly acquired lane line is detected to not match with a history lane line, the pseudo lane module removes the newly acquired lane line and the history lane line is used in its place as the pseudo lane line output. In this case, pseudo lane module can still output lane lines when there is an abrupt change in lane lines perceived by the camera device. In another embodiment, pseudo lane lines are generated from the tailgating trajectory of the ADV. In this case, there may not be any lane lines markings on a roadway, or only a one-sided lane line is available, however, pseudo lane lines can still be generated using a predetermined lane line spacing for the ADV using a trajectory of the CIPV. The pseudo lane lines can then be used as historical lane lines to generate subsequent lane lines. In another embodiment, the pseudo lane lines can be uploaded onto server 103 to be used as historical lane lines by other ADVs.

Final Output

The output of workflow 500 may be different with that of a LIDAR-based system. For example, the outputs can include lane lines outputs, e.g., polylines and/or polynomial curves, a type information for the lane lines outputs, e.g., L1(next left lane line), L0(left lane line), R0(right lane line), R1(next right lane line), etc., and object outputs, which may be represented by 3D boundary boxes, and any information associated with these objects such as, relative velocity and direction, whether it is a CIPV, and their classifications e.g., truck, car, pedestrian, bike, etc. In one embodiment, based on these outputs, ADV can generate a trajectory based on either following/tailgating the CIPV, or following the lane lines. ADV can then send control commands using control module 306 based on the trajectory to control the ADV.

Figure 9:
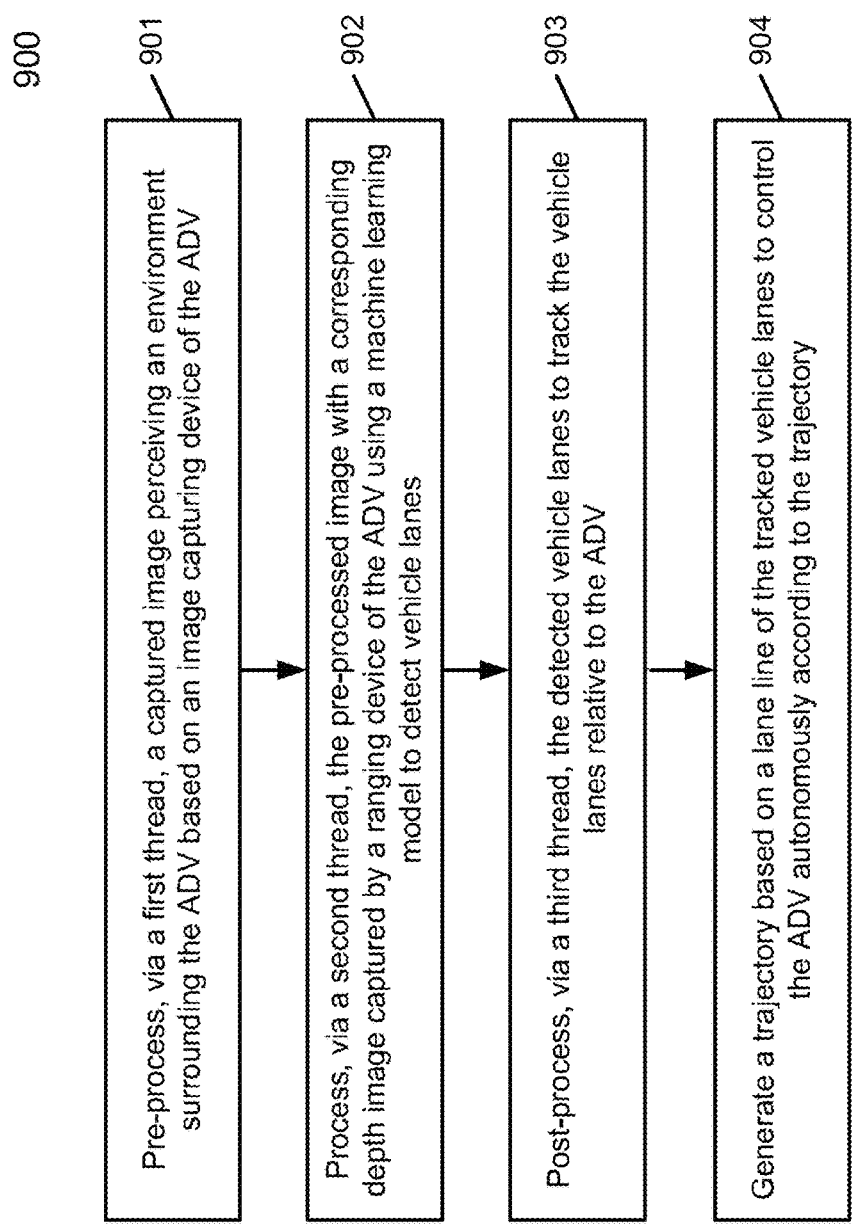
FIG. 9 is a flow diagram illustrating a method according to one embodiment.

FIG. 9 is a flow diagram illustrating a method according to one embodiment. Processing 900 may be performed by processing logic which may include software, hardware, or a combination thereof. For example, process 900 may be performed by lane/object detect/track module 308 of FIG. 3A. Referring to FIG. 9, at block 901, processing logic pre-processes, via a first thread, a captured image perceiving an environment surrounding the ADV obtained from an image capturing device of the ADV. At block 902, processing logic processes, via a second thread, the pre-processed image with a corresponding depth image captured by a ranging device of the ADV using a machine learning model to detect vehicle lanes. At block 903, processing logic post-processes, via a third thread, the detected vehicle lanes to track the vehicle lanes relative to the ADV. At block 904, processing logic generates a trajectory based on a lane line of the tracked vehicle lanes to control the ADV autonomously according to the trajectory.

Figure 10:
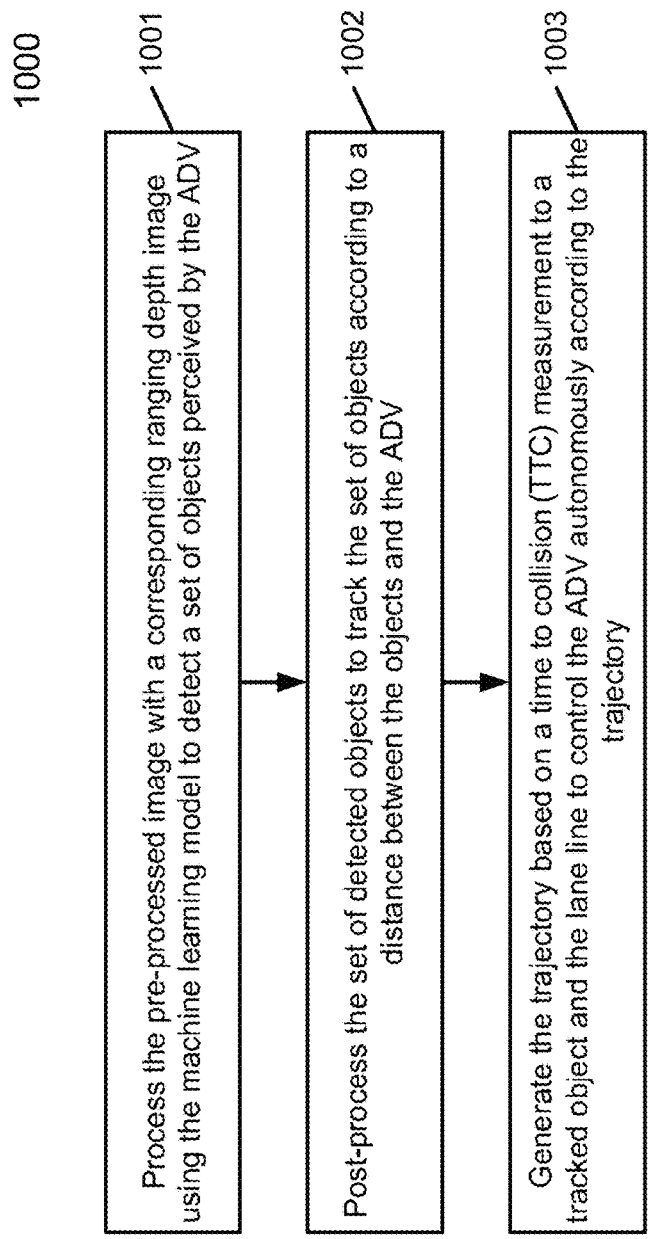
FIG. 10 is a flow diagram illustrating a method according to one embodiment.

FIG. 10 is a flow diagram illustrating a method according to one embodiment. Processing 1000 may be performed by processing logic which may include software, hardware, or a combination thereof. For example, process 1000 may be performed by lane/object detect/track module 308 of FIG. 3A. Referring to FIG. 10, at block 1001, processing logic processes the pre-processed image with a corresponding ranging depth image using the machine learning model to detect a set of objects perceived by the ADV. At block 1002, processing logic post-processes the set of detected objects to track the set of objects according to a distance between the objects and the ADV. At block 1003, processing logic generates the trajectory based on a time to collision (TTC) measurement to a tracked object and the lane line to control the ADV autonomously according to the trajectory.

In one embodiment, for each object, determining a distance from the ADV to the object, determining a velocity of the object, and determining the time to collision (TTC) for the object. In one embodiment, pre-processing the image includes adjusting a white balancing, a gain control, or a tone mapping of the perceived image. In one embodiment, the captured image is a red-green-blue (RGB) image and wherein processing the pre-processed image with a corresponding depth image comprises fusing the RGB image with the corresponding depth image to generate a RGB-D (red-green-blue-depth) image.

In one embodiment, post-processing the detected vehicle lanes to track the vehicle lanes relative to the ADV includes: estimating a pose of the image-capturing device of the ADV based on a previous vehicle lanes captured by the image-capturing device and an IMU unit of the ADV, and tracking the vehicle lanes using the image-capturing device based on the estimated pose of the image-capturing device. In another embodiment, if one or more vehicle lane lines are missing from the tracked vehicle lanes, generating one or more virtual lane lines for the tracked vehicle lanes based on a historical trajectory or a predetermined lane width of the vehicle lanes.

In another embodiment, the first thread and the second thread are executed by one or more graphics processing units (GPUs), and the third thread is executed by one or more central processing units (CPUs).

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 11:
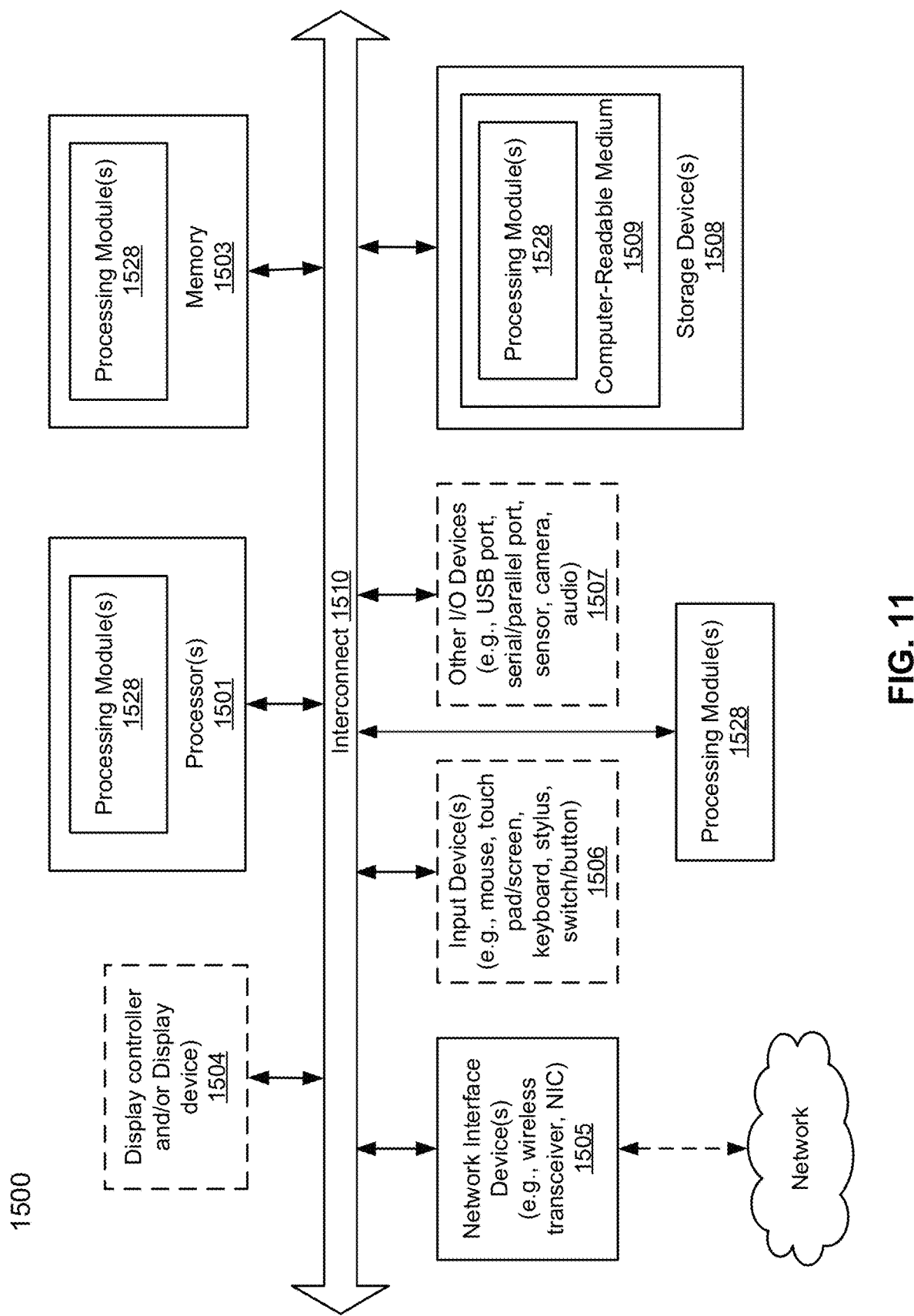
FIG. 11 is a block diagram illustrating a data processing system according to one embodiment.

FIG. 11 is a block diagram illustrating an example of a data processing system which may be used with one embodiment of the disclosure. For example, system 1500 may represent any of data processing systems described above performing any of the processes or methods described above, such as, for example, perception and planning system 110 or servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional 10 device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

TO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, lane/object detect/track module 308 of FIG. 3A. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method to generate a driving trajectory for an autonomous driving vehicle (ADV), the method comprising:
   pre-processing a captured image perceiving an environment surrounding the ADV obtained from an image capturing device of the ADV;
   processing the pre-processed image with a corresponding depth image captured by a ranging device of the ADV using a machine learning model, including fusing the pre-processed image with the corresponding depth image, to detect vehicle lanes;
   post-processing the detected vehicle lanes to track the vehicle lanes relative to the ADV; and
   generating a trajectory based on a lane line of the tracked vehicle lanes to control the ADV autonomously according to the trajectory.

2. The method of claim 1, further comprising:
   processing the pre-processed image with a corresponding ranging depth image using the machine learning model to detect a set of objects perceived by the ADV;
   post-processing the set of detected objects to track the set of objects according to a distance between the objects and the ADV; and
   generating the trajectory based on a time-to-collision (TTC) measurement to a tracked object and the lane line to control the ADV autonomously according to the trajectory.

3. The method of claim 2, wherein post-processing the set of objects comprises:
   for each object,
      determining a distance from the ADV to the object;
      determining a velocity of the object; and
      determining a TTC for the object.

4. The method if claim 1, wherein pre-processing the captured image comprises: adjusting a white balancing, a gain control, or a tone mapping of the captured image.

5. The method of claim 1, wherein the captured image is a red-green-blue (RGB) image and wherein processing the pre-processed image with a corresponding depth image comprises fusing the RGB image with the corresponding depth image to generate an RGB-D (red-green-blue-depth) image.

6. The method of claim 1, wherein post-processing the detected vehicle lanes to track the vehicle lanes relative to the ADV comprises:
   estimating a pose of the image-capturing device of the ADV based on a previous vehicle lanes captured by the image-capturing device and an IMU unit of the ADV; and
   tracking the vehicle lanes using the image-capturing device based on the estimated pose of the image-capturing device.

7. The method of claim 6, further comprising:
   if one or more vehicle lane lines are missing from the tracked vehicle lanes, generating one or more virtual lane lines for the tracked vehicle lanes based on a historical trajectory or a predetermined lane width of the vehicle lanes.

8. The method of claim 1, wherein pre-processing a captured image, processing the pre-processed image, and post-processing the detected vehicle lanes are performed using different threads in a pipelined manner.

9. A non-transitory machine-readable medium having instructions stored therein, which when executed by a processor, cause the processor to perform operations, the operations comprising:
   pre-processing a captured image perceiving an environment surrounding an autonomous driving vehicle (ADV) obtained from an image capturing device of the ADV;
   processing the pre-processed image with a corresponding depth image captured by a ranging device of the ADV using a machine learning model, including fusing the pre-processed image with the corresponding depth image, to detect vehicle lanes;
   post-processing the detected vehicle lanes to track the vehicle lanes relative to the ADV; and
   generating a trajectory based on a lane line of the tracked vehicle lanes to control the ADV autonomously according to the trajectory.

10. The non-transitory machine-readable medium of claim 9, wherein the operations further comprise:
    processing the pre-processed image with a corresponding ranging depth image using the machine learning model to detect a set of objects perceived by the ADV;
    post-processing the set of detected objects to track the set of objects according to a distance between the objects and the ADV; and
    generating the trajectory based on a time to collision (TTC) measurement to a tracked object and the lane line to control the ADV autonomously according to the trajectory.

11. The non-transitory machine-readable medium of claim 10, wherein post-processing the set of objects comprises:
    for each object,
       determining a distance from the ADV to the object;
       determining a velocity of the object; and
       determining a TTC for the object.

12. The non-transitory machine-readable medium of claim 9, wherein pre-processing the captured image comprises: adjusting a white balancing, a gain control, or a tone mapping of the captured image.

13. The non-transitory machine-readable medium of claim 9, wherein the captured image is an RGB image and wherein processing the pre-processed image with a corresponding depth image comprises fusing the RGB image with the corresponding depth image to generate an RGB-D image.

14. The non-transitory machine-readable medium of claim 9, wherein post-processing the detected vehicle lanes to track the vehicle lanes relative to the ADV comprises:
    estimating a pose of the image-capturing device of the ADV based on a previous vehicle lanes captured by the image-capturing device and an IMU unit of the ADV; and
    tracking the vehicle lanes using the image-capturing device based on the estimated pose of the image-capturing device.

15. The non-transitory machine-readable medium of claim 14, wherein the operations further comprise:

if one or more vehicle lane lines are missing from the tracked vehicle lanes, generating one or more virtual lane lines for the tracked vehicle lanes based on a historical trajectory or a predetermined lane width of the vehicle lanes.

16. The non-transitory machine-readable medium of claim 9, wherein pre-processing a captured image, processing the pre-processed image, and post-processing the detected vehicle lanes are performed using different threads in a pipelined manner.

17. A data processing system, comprising:
a processor; and
a memory coupled to the processor to store instructions, which when executed by the processor, cause the processor to perform operations, the operations including:
pre-processing a captured image perceiving an environment surrounding an autonomous driving vehicle (ADV) obtained from an image capturing device of the ADV;
processing the pre-processed image with a corresponding depth image captured by a ranging device of the ADV using a machine learning model, including fusing the pre-processed image with the corresponding depth image, to detect vehicle lanes;
post-processing the detected vehicle lanes to track the vehicle lanes relative to the ADV; and
generating a trajectory based on a lane line of the tracked vehicle lanes to control the ADV autonomously according to the trajectory.

18. The system of claim 17, wherein the operations further comprise:
processing the pre-processed image with a corresponding ranging depth image using the machine learning model to detect a set of objects perceived by the ADV;
post-processing the set of detected objects to track the set of objects according to a distance between the objects and the ADV; and
generating the trajectory based on a time to collision (TTC) measurement to a tracked object and the lane line to control the ADV autonomously according to the trajectory.

19. The system of claim 18, wherein post-processing the set of objects comprises:
for each object,
determining a distance from the ADV to the object;
determining a velocity of the object; and
determining a TTC for the object.

20. The system of claim 17, wherein pre-processing the captured image comprises: adjusting a white balancing, a gain control, or a tone mapping of the captured image.

21. The system of claim 17, wherein the captured image is an RGB image and wherein processing the pre-processed image with a corresponding depth image comprises fusing the RGB image with the corresponding depth image to generate an RGB-D image.

* * * * *